April 17, 1951  F. E. GILMORE  2,548,966
CATALYTIC REACTOR
Filed Dec. 1, 1949

INVENTOR.
F. E. GILMORE
BY Hudson & Young
ATTORNEYS

Patented Apr. 17, 1951

2,548,966

UNITED STATES PATENT OFFICE 2,548,966

CATALYTIC REACTOR

Forrest E. Gilmore, Bartlesville, Okla., assignor to Phillips Petroleum Company, a corporation of Delaware Application December 1, 1949, Serial No. 130,387

10 Claims. (Cl. 23—288)

This invention pertains to an improved catalytic reactor. In one of its preferred embodiments, the invention pertains to a novel construction of cartridges intended to hold a body of particulate catalyst, said cartridges being readily insertable into and recoverable from a cylindrical reaction chamber. The various features of the apparatus of this invention are applicable not only to catalytic reactors, but likewise to any other system wherein a fluid is contacted with a body of particulate material which on occasion must be removed from the system for revivification or replacement, for example the selective adsorption and desorption of one component of a gas or liquid, or the drying of gases and liquids by passing through a granular desiccant.

In the contacting of fluids with particulate substances, various methods and apparatus have heretofore been employed. Probably the most common is the use of a chamber filled with the particles, for example, catalyst, adsorbent, or desiccant, through which the fluid to be treated is passed. Ultimately the catalyst or the like must be removed and discarded, or at least revivified by known methods. The necessity for this is dependent on the conditions of the treatment and the type of reaction, if any, which occurs within the chamber. Particularly with high temperature treatment of organic materials, for example cracking of hydrocarbon oils, polymerization of low-boiling olefins, destructive or non-destructive hydrogenation of oils, desulfurization and reforming of naphtha, and the like, the catalyst ultimately becomes so fouled with carbonaceous material and also with deposits of minerals which may be in the feed streams, that the catalyst must be "dumped" and replaced with fresh catalyst. Ordinarily, a body of catalyst may be used for a large number of successive conversion-reactivation cycles before this is necessary, but the replacement with fresh catalyst must be done at least once or twice a year and often once every few weeks. One common procedure is to build the chamber with sufficient clear space below to allow dumping of the catalyst by opening the bottom thereof, and trucks or conveyors or other means are used to remove the dumped catalyst. The chamber is then closed and filled from the top. Another procedure is to utilize a permanent tube or pipe as a part of the structure of the chamber for removing and adding catalyst, one specific modification of this being described hereinafter. The problem is complicated when the catalyst is arranged in a plurality of separate super-imposed beds within a reactor allowing for introduction of feed and/or diluent between the various beds, as in this case each bed is supported on a separate grid within the chamber. No matter what procedure is used, the catalytic unit must be down for a considerable period of time for the catalyst replacement operation, with consequent loss of production. In many cases, labor and handling costs are excessive.

It has been proposed to supply catalyst in separate cartridges for use in a reaction chamber. Various different types of cartridges have been suggested. These are sometimes used by the method of introducing a cartridge of fresh catalyst at one end of the chamber and removing a cartridge of spent catalyst at the other end of the chamber. In other instances, the chamber is loaded with several cartridges to start with and these cartridges are removed and replaced with fresh cartridges periodically. The present invention provides an improved type of cartridge for use in a catalytic system of the type described. My improved cartridges and associated equipment provide various advantages over formerly known cartridges and obviate difficulties encountered with same and with the various fixed bed procedures heretofore described.

An object of this invention is to provide improved apparatus for contacting fluids with solids. Another object of the invention is to provide a cartridge construction especially adapted for containing a solid desiccant, catalyst or other contact material, and readily insertable into and removable from a contacting chamber. A further object is to minimize friction and sticking between cartridge and walls of a catalyst chamber. Another object is to ensure satisfactory seal between cartridge and chamber wall during use. Yet another object is to facilitate removal of a catalyst-containing cartridge from a reactor when the catalyst is to be discarded or reactivated. A still further object is to avoid complicated permanent internal structure for supplying and removing particulate material in a chamber through which gases or liquids are passed for contact with such material. Another object is to provide cartridges and spacers adapted to fit within a reactor while allowing fluid entry between successive cartridges. Further objects and advantages of the invention will be apparent to one skilled in the art, from the accompanying disclosure and discussion.

The attached drawings disclose in detail a preferred general embodiment of my invention together with certain modifications thereof. The invention will accordingly be described with reference to the drawings. It will be apparent that other modifications not specifically shown and described may be made without departing from the spirit and scope of the invention as broadly described and specifically exemplified herein.

Figure 1:
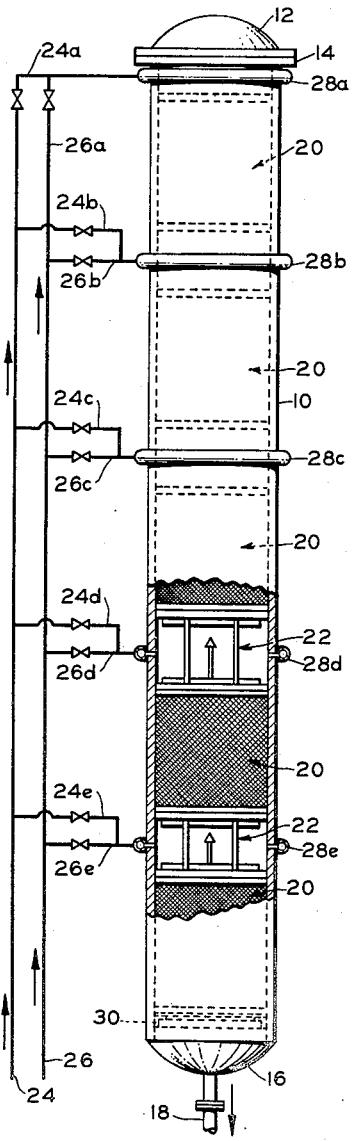
Figure 1 is an elevation view of a preferred form of catalyst chamber, a portion thereof being cut away to show in vertical cross section the internal arrangement of catalyst cartridges.

In Figure 1, numeral 10 indicates a vertical cylindrical reaction chamber, arranged in a manner convenient for effecting the catalytic polymerization of low-boiling olefins, and which will be described with reference to use in such a process although it is adapted to many other processes. The reactor shell 10 is surmounted at the top by a cover 12 suitably bolted or otherwise removably attached to shell 10 by flanges 14. The bottom 16 of chamber 10 is closed except for a conduit 18 leading therefrom for removal of reaction product or other fluids passed through the chamber. The reactor contains, in the embodiment shown on the drawing, five cartridges indicated by reference numeral 20, each filled with a suitable catalyst for the reaction, for example a synthetic silica-alumina gel for the polymerization of an unsaturated C3-C4 fraction. The cartridges are separated one from another by separators or "spools" 22, the details of which will be described with reference to Figure 2. Conduit 24 is provided for carrying fresh feed while conduit 26 is provided for carrying cool recycle feed or separate butane diluent for temperature control. Valved branched conduits 24A, 24B, 24C, 24D and 24E are used for passing the feed into various levels of the catalyst chamber between the catalyst cartridges as desired, and valved branched conduits 26A, 26B, 26C, 26D and 26E similarly carry the recycle or diluent. The corresponding branched conduits join, and enter donut distributor rings 28A, 28B, 28C, 28D and 28E, respectively, each of which is arranged circumferentially about shell 10 which contains a plurality of holes permitting flow of fluids from the distributor rings 28 into the interior of the reactor between the respective cartridges. The spools 22 separate the cartridges and allow free spaces therebetween for introduction of the fluids as described. The bottom cartridge may rest on the bottom 16 of the reactor shell 10, or a separate angle iron or similar support 30 may be provided as indicated in the drawing for support of the superimposed series of cartridges and spools.

Figure 2:
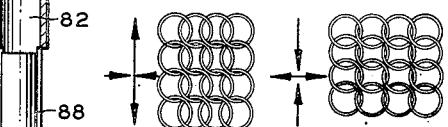
Figure 2 is a detailed vertical cross section of one preferred form of cartridge and associated spacer spool, the view being exploded to the extent that the spool is separated from the cartridge with which it is ordinarily in contact.

Attention is now directed to Figure 2 wherein there is shown a cartridge, and a spool for resting on top of the cartridge and in turn supporting a higher cartridge (not shown), the spool and cartridge being separated in the drawing for an easier understanding of the construction. The cartridge is made up of a cylinder of woven wire 32, which preferably takes the form of a simple rectangular weave of wire in the manner of an ordinary screen. However, the cylinder of woven wire is cut on the bias, i. e. the wires run spirally at an angle to the elements of the cylinder as two sets of helices, the members of each set being parallel to each other and perpendicular to the other set. Most conveniently cylinder 32 is made by cutting a rectangularly woven screen on the bias to form the necessary rectangle, and then joining opposite ends thereof together to form the cylinder, in which case the individual wires assume a helical shape rather than that shown diagrammatically in Figure 2. Alternatively, the cylinder can be woven as a cylinder, with the wires if desired following the oval curves made by intersection of a series of planes with a cylinder at an angle to its axis, giving the appearance of Figure 2. The screen 32 may for example be made from heavy stainless steel wire, for example, No. 8 or 10 wire, and its openings are made smaller than the particles of catalyst which it is designed to hold. For example, for an 8 to 10 mesh silica-alumina polymerization catalyst, the screen 32 should have openings not exceeding $\frac{1}{16}$ inch across. The screen cylinder 32 of the cartridge is fastened similarly at the top and bottom to rings 34 and 36 respectively which are preferably circular angle irons as shown. These rings in turn are fastened, as by screws 38 and 40, to top and bottom plates 42 and 44 respectively. These plates are perforated allowing the ready flow of gases and liquids through perforations 46.

The diameter of top and bottom plates 42 and 44, and top and bottom rings 34 and 36, is slightly less than the internal diameter of reactor shell 10, the particular diameter being chosen to allow a free fit within the reactor shell 10 at the maximum and minimum temperatures to which it is expected to be subjected. The normal diameter of the screen cylinder 32 is about the same, i. e. slightly less than the internal diameter of shell 10. Top plate 42 is provided with a lifting spear or lug 48 for lowering and raising the cartridge into and out of the reactor 10. In operation, the bottom plate 46 is fastened in place, the cartridge filled with catalyst, and the top plate 42 then fastened in place. The cartridge is then lifted by means of lug 48, and the diameter of the wire cylinder 32 is decreased by virtue of the vertical pull. Thus the cartridge becomes somewhat elongated but then has a smaller diameter, which is appreciably less than the internal diameter of shell 10. While thus under tension the cartridge is easily lowered into shell 10, and after being placed therein, the lifting tool is detached thus relaxing the vertical tension. When this happens, by virtue of the construction of cylinder 32, the same collapses somewhat with a consequent increase in diameter throughout the cylinder. Thus cylinder 32 comes in contact with the inner surface of shell 10 essentially over its entire area as it is under longitudinal pressure from the bed of catalyst particles which it contains. Correspondingly, whenever the cartridge is to be removed, an upward pull on lifting spear 48 causes vertical elongation of cylinder 32 and consequent contraction in diameter which pulls the cylinder 32 away from the walls of shell 10. The cartridge is then easily lifted from the reactor shell.

The cartridge of Figure 2 is provided with a plurality of connecting rods, each comprising a pair 50 and 52. The upper rod 50, which is attached to top plate 42, carries a loop 54 at its lower end which is looped around rod 52. Similarly, bottom rod 52 which is attached to bottom plate 44 carries at its upper end loop 56 which loops around rod 50. These pairs of rod, the parts being thus connected, limit the vertical movement of top plate 42 away from bottom plate 44 so that on lifting, the wire cylinder 32 does not have to carry the full weight of the cartridge. This prevents an accidental pulling away of the wire screen cylinder 32 from top ring 34 and bottom ring 36 while the cartridge is being handled. The bottom rod 52 of each pair also carry a loop or other projection 58 which limits the downward motion of the upper part of the cartridge, so that when the catalyst-filled cartridge is allowed to settle by its own weight and expand into contact with the walls of reactor 10 the upper plate 42 will not bear its own weight and the weight of cartridges above it directly on top of the mass of catalyst contained within the cartridge. From the foregoing it will be apparent that the rod pairs 50—52 are arranged to permit sufficient vertical motion of the cartridge to accomplish the necessary decrease and increase in diameter thereof.

Figure 2 also shows in detail the construction of the spools 22 which act as spacers between the cartridges. The spool is composed of an upper plate 60 and a lower plate 62, each containing a large number of perforations 64 designed to register with the corresponding perforations 46 in the top and bottom plates 42 and 44 of the cartridge. Plates 60 and 62 are preferably though not necessarily of somewhat smaller diameter than the cartridge. Both plates are in annular form, having a large hole 66 in the center. This hole is designed to allow the spool to fit down over the lifting lug 48 and to allow access thereto by a suitable lifting tool carried by a crane. Top and bottom plates 60 and 62 are joined in any suitable manner, as for example by a plurality of vertical angle iron supports 68. In order to assure exact registration of perforations 64 with perforations 46 so that fluids may easily pass through the reactor, plate 60 is provided with at least two upwardly pointing pins or dimples 70 adapted to register in suitable corresponding holes in the bottom plate 44 of the cylinder which surmounts the spool. Similarly, bottom plate 62 of the spool contains dimples or pins 72 for the same purpose of registering with holes in top plate 42 of the cartridge upon which it rests. The pins 70 and 72 and the top plates 60 and 62 are identical in construction and area so that there is no difference in the spool regardless of which plate is up and which is down. Those skilled in the art will readily understand suitable construction of lifting tool adapted to fit spear 48 and engage same with an upward pull, and to release same when the tension is relaxed on lowering the cartridge to a resting position.

Figure 3:
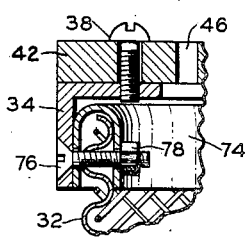
Figure 3 is a detailed drawing of the attachment of the enclosing sheath of the cartridge to the top plate, this view being an enlargement of the portion of Figure 2 indicated by the numerals 3—3 thereon.

Figure 3 shows in detail one preferred method of attaching the mesh cylinder 32 to the angle iron ring 34. This is accomplished by use of a circular steel band 74 of U-shape cross section applied over the top of the wire sheath 32, which crimps the wire on tightening of the bolts 76 and nuts 78. Other methods of attachment of course may be designed.

Any suitable method of weaving or fabricating the meshed material used in constructing cylinder 32 may be employed, so long as the resulting material when in such a cylinder form is capable of decreasing the diameter on application of lengthwise tension to the cylinder. There are many types of mesh which will not allow this. The type of mesh itself must be capable of giving this effect, as reliance cannot be placed on mere expansion of the material from which the cylinder is made because of softness or elasticity. Likewise, although a flexible cylinder of fixed diameter will collapse on removal of lengthwise tension, it will not collapse in an even manner which would permit an increased diameter throughout the length of the cylinder; hence, this type of cylinder should not be used because of unequal and poor contact with the walls of reactor 10. It is important that this contact be essentially complete over the entire surface in order to avoid serious channeling of gas flow around the catalyst body.

Figures 4, 5, 6:
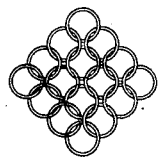
Figures 4 and 5 are details of a portion of one type of mesh suitable for use in making the cartridges, Figure 4 showing same when under vertical tension, and Figure 5 showing same when the vertical tension is relaxed.
Figure 6 is a similar detail of the same type of mesh when used diagonally.

In addition to the form of mesh shown in Figure 2, another preferred form of mesh is shown in detail in Figures 4, 5 and 6. This is made up of small circles or lengths of wire interlaced with each other. In the form shown in Figures 4 and 5, wherein the rows of loops run horizontally and vertically, it is essential that top and bottom rings 34 and 36 (Figure 2) be definitely of smaller diameter than the maximum diameter of the cylinder 32. On applying vertical tension, the mesh tends to take the form shown in Figure 4 because the topmost and bottommost circles of links of necessity are of small diameter dictated by rings 34 and 36 and the remaining portions of the cylinder attempt to conform to this diameter which is less than the internal diameter of column 10. On release of the vertical tension, with the weight of the links themselves and additionally the horizontal pressure obtained from the fluent mass of catalyst particles confined within the cylinder, the mesh takes the form shown in Figure 5 resulting in an increased diameter of the cylinder. Various other types of mesh can be used in the same manner, so long as they have sufficient freedom of lateral motion to allow the above-described expansion and contraction of cylinder diameter. The mesh made of interlaced circles, shown in Figures 4 and 5 as used in vertical-horizontal alignment, can also be used in diagonal, i. e. helical, alignment, or in other words "on the bias;" this is illustrated in Figure 6. This latter arrangement is ordinarily preferred, as giving a stronger effect on the cylinder diameter than that obtained solely by virtue of the narrowed diameters of top and bottom rings 34 and 36 just discussed. Other suitable forms of fabrication can be designed to obtain the result disclosed herein.

Figure 7:
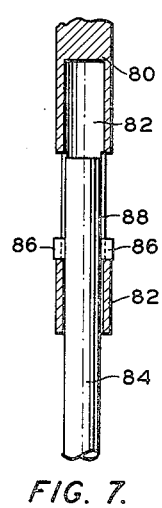
Figure 7 illustrates a type of connection and support rod which is alternative to that shown in Figure 2.

Figure 7 illustrates a form of rod which is alternative to rod pairs 50—52 shown in Figure 2. In Figure 7, an upper rod 80 is provided at its lower end with tube 82. A lower rod 84 is provided near its upper end with outwardly projecting lugs or ears 86. These latter fit within corresponding vertical slots 88 cut in tube 82. The lower end of slots 88 engage lugs 86 when a pull is inserted on the cartridge so that on engagement the weight is carried by the two rods. On release of the tension, tube 82 telescopes down over rod 84 with the lugs 86 sliding in slot 88, and the bottom of rod 80 comes to rest on the top of rod 84, thus limiting the downward motion of the upward plate 42 to which rod 80 is attached and preventing its resting on the catalyst bed within the cartridge. The maximum elongation of the telescoping rods should be just slightly less than the permissible elongation of the cylinder 32.

If desired, the cartridge shell may be covered with paper or otherwise coated to minimize its sticking within shell 10 which can happen if water or other extraneous material should enter with the feed hydrocarbons. This coating under suitable conditions can be a silicone lubricant, or graphite. Even should the cartridge become stuck to the interior walls of chamber 10 for this or other reasons such as carbon deposition, the construction described permits sufficient force, in the way of a steady pull or jerk, to be applied to the cartridges to effect their ready removal. The decrease in diameter which occurs on elongation of the cylinder provides an effective means for withdrawing the cylinder from contact with the walls of shell 10 and permitting its easy removal from the shell without the severe friction encountered with former types of catalyst cartridges and without the necessity for special structures for sealing the space between cartridge and reactor wall which sometimes have been suggested.

Some of the advantages may be illustrated by reference to a particular type of catalytic polymerization unit. In one such unit, several beds of catalyst are supported on removable grids around a removable center pipe made in sections to fit the grid space. In filling, the bottom pipe section is installed and sufficient catalyst is put in to fill almost to the elevation of the next grid. Then another grid and pipe section is put in, catalyst added, and this is repeated until the reactor is charged with catalyst. To empty, which may be necessary as many as three times per year, the top section of pipe is removed (sometimes with difficulty) and the catalyst flushed into the pipe hydraulically using 350 p. s. i. g. or greater water pressure. Each grid and pipe section is removed in succession. Sometimes the catalyst sets up, and picks and other tools must be used under cramped conditions in the relatively small reactor. It will be apparent that this operation requires many hours, often as much as one to two days. In contrast, when using my cartridges one set of same is filled in the catalyst storage building under cover rather than in the open air while the catalyst chamber is operating, and without shutting down the process flow. Such a set of filled cartridges can be prepared at leisure whenever the workmen have time, and set away for future use. When the catalyst is to be changed, the filled cartridges, and spools, are taken to the catalyst chamber while the latter is being purged of hydrocarbons, as with steam. When the purging is complete, the chamber is opened at the top (or bottom or both, depending on the chamber construction) and the cartridges contained therein are quickly removed by a special handling tool adapted for use in conjunction with the lifting spear on the top of the cartridge. The used catalyst cartridges can be removed in a very short time, even while the chamber is still hot. The chamber is immediately charged with the fresh cartridges, being spaced from each other by spools as described, and the chamber cover replaced and bolted. As soon as the chamber with its fresh supply of catalyst is purged of air, the hydrocarbon feed is turned in and the process continued. The cartridges removed from the chamber are taken to the catalyst disposal area (or to revivification means if the catalyst is to be revivified), and the contents may be removed and the cartridges refilled at leisure.

Another advantage of my cartridges is that they may be made of a relatively small diameter for use in small diameter tubes, which are very desirable and almost necessary for extremely high pressure operation. Use of loose catalyst for such high pressure reactions definitely limits the minimum size of the reactor. It is very difficult to remove such catalyst from small tubes when it becomes set. My cartridges obviate this difficulty. Other advantages will be apparent to one skilled in the art, who can also devise various modifications of the specific details shown herein without departing from the invention.

I claim:

1. Apparatus for effecting catalytic reactions which comprise an elongated vertical cylindrical reaction chamber of smooth internal bore, a removable cover therefor, a plurality of annular inlet conduits encircling said chamber at equally spaced distances along the length thereof, each of said conduits being connected with the interior of said chamber by a plurality of openings through the wall of said chamber, conduits for introducing fluid into each of said annular inlet conduits, an outlet for fluid from said chamber, within said chamber a plurality of vertically alternated catalyst cartridges and spacer spools the latter being within said annular inlet conduits, each said spacer spools comprising perforate top and bottom horizontal plates of smaller diameter than the internal diameter of said chamber with vertical spacing and supporting means therebetween, each said catalyst cartridges comprising perforate top and bottom horizontal plates of smaller diameter than the internal diameter of said chamber and having positioning means cooperating with corresponding positioning means on said spacer spools to insure registration of perforations therebetween, vertical connecting rods between said top and bottom cartridge plates including stop elements permitting only limited vertical motion of said plates toward and away from each other, and a cylinder attached at its top and bottom to said top and bottom plates respectively along the periphery thereof and composed of mesh permitting an increase in cylinder length and decrease in cylinder diameter to a value less than the internal diameter of said chamber on application of vertical tension thereto and an increase in cylinder diameter along at least most of the length thereof on release of said vertical tension within said chamber when said cartridge is filled with particulate catalyst.

2. Apparatus according to claim 1 including handle means in the center of said top plate of each catalyst cartridge adapted for lifting and lowering said cartridge, said top and bottom plates of each said spacer spools having an opening in the center thereof through which said handle means projects and through which the same may be grasped for lifting and lowering said cartridge within said chamber.

3. Apparatus according to claim 2 wherein said handle means is a vertical spear, and each said top and bottom plates of said spacer spools is an annulus through the lower of which said spear projects.

4. Apparatus according to claim 1 wherein said cylinder is made of rectangularly woven wire cut on the bias.

5. Apparatus according to claim 1 wherein said cylinder is made of interlocked links arranged in vertical and horizontal rows with freedom of lateral motion sufficient to permit change in diameter of said cylinder, and the top and bottom of said cylinder is of sufficiently smaller diameter than the internal diameter of said chamber to effect the described change in diameter on application and release of vertical tension.

6. Apparatus according to claim 1 wherein said mesh cylinder is made of interlocking links arranged in helical rows.

7. A cartridge for containing a mass of particulate material adapted for simple insertion into and removal from a vertical cylindrical fluid-solid contacting chamber which comprises perforate top and bottom horizontal circular plates, vertical connecting rods between said top and bottom plates including stop elements permitting only limited vertical motion of said plates toward and away from each other, and a cylinder attached at its top and bottom to said top and bottom plates respectively along the periphery thereof and composed of mesh permitting an increase in cylinder length and decrease in cylinder diameter on application of vertical tension thereto and an increase in cylinder diameter along at least most of the length thereof on release of said vertical tension when said cartridge is filled with particulate material.

8. A cartridge according to claim 7 wherein said cylinder is made of rectangularly woven wire cut on the bias.

9. A cartridge according to claim 7 wherein said cylinder is made of interlocked links arranged in vertical and horizontal rows with freedom of lateral motion sufficient to permit change in diameter of said cylinder, and the top and bottom of said cylinder is of sufficiently smaller diameter than the maximum diameter of said cylinder to effect the described change in diameter on application and release of vertical tension.

10. A cartridge according to claim 7 wherein said mesh cylinder is made of interlocking links arranged in helical rows.

FORREST E. GILMORE.

No references cited.